SUBMERSIBLE MISSILE LAUNCHING VEHICLE

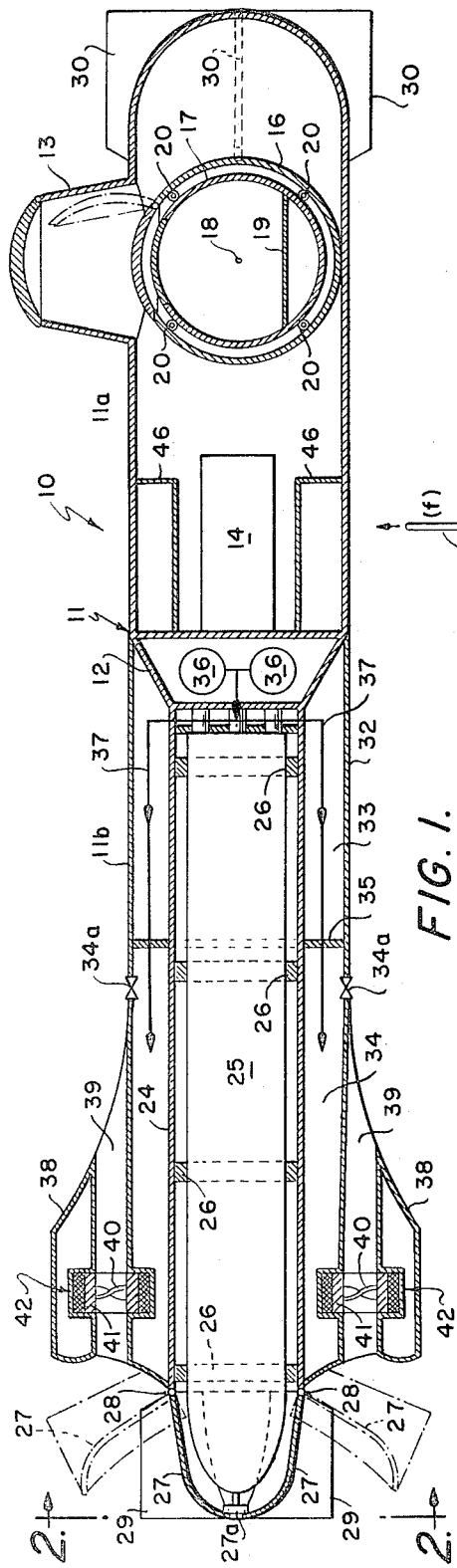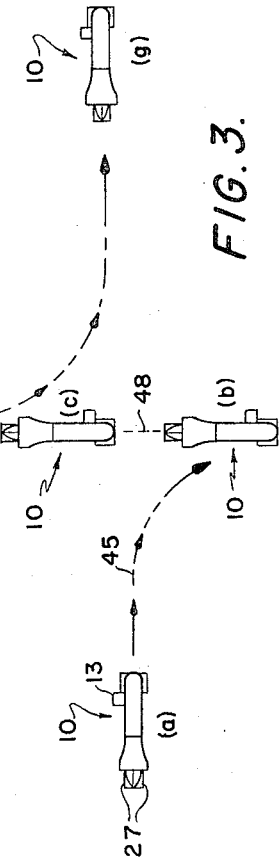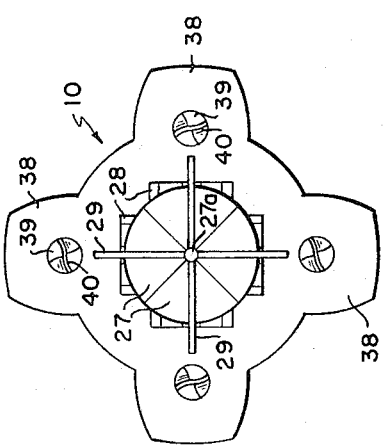
FIG. 1.
FIG. 3.
FIG. 2.
INVENTORS
GUENTHER W. LEHMANN
KURT G. F. MOELLER Jan. 31, 1967  G. W. LEHMANN ET AL  3,301,132

Filed July 29, 1965  4 Sheets-Sheet 2

INVENTORS
GUENTHER W. LEHMANN
KURT G. F. MOELLER

BY
ATTYS.

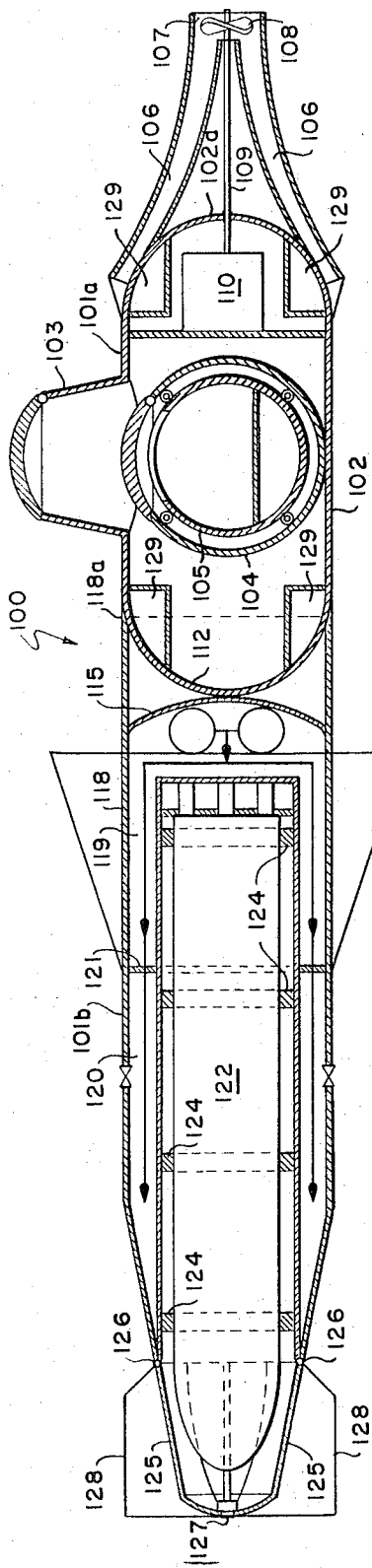
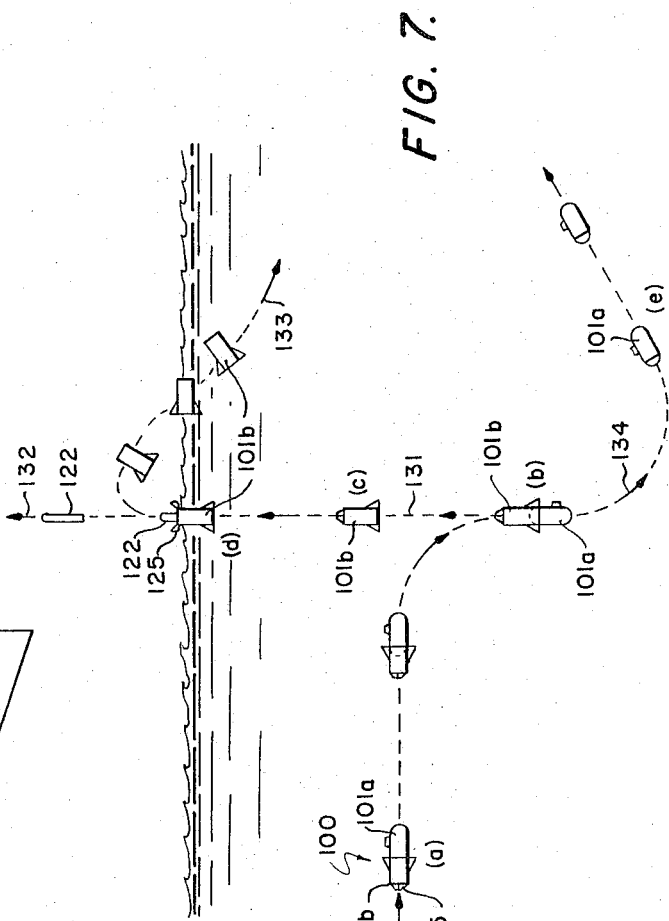

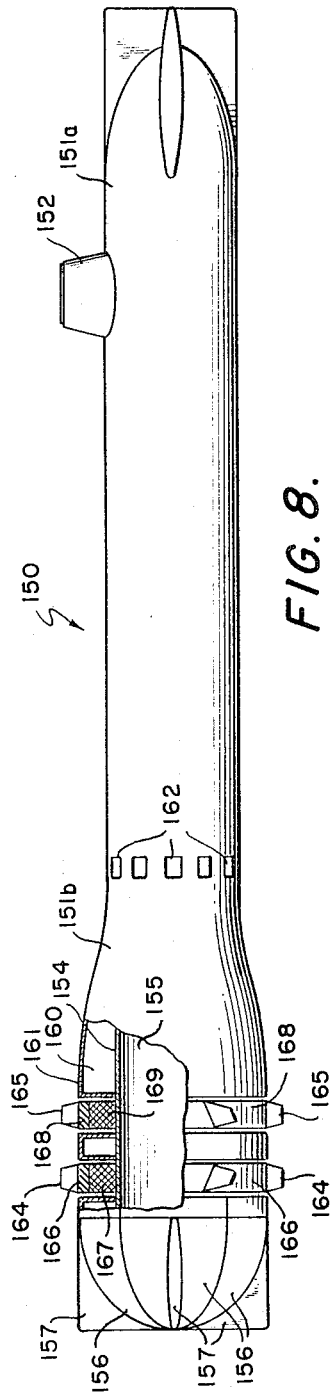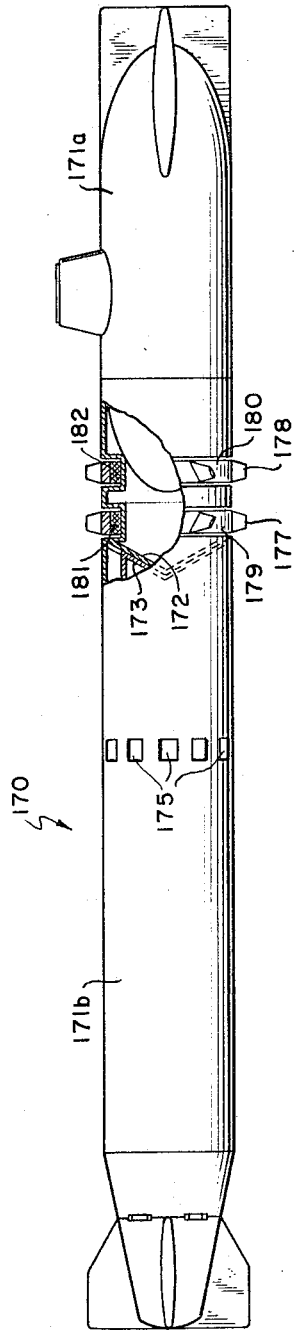

United States Patent Office 3,301,132
Patented Jan. 31, 1967

3,301,132
SUBMERSIBLE MISSILE LAUNCHING VEHICLE
Guenther W. Lehmann, New London, Conn., and Kurt G. F. Moeller, Annapolis, Md., assignors to the United States of America as represented by the Secretary of the Navy
Filed July 29, 1965, Ser. No. 476,781
8 Claims. (Cl. 89—1.81)

The invention described herein may be manufactured and used by or for the Government of the United States of America for governmental purposes without the payment of any royalties thereon or therefor.

This invention relates to launching of missiles from under water, and more particularly to improved submersible vehicles capable of effecting such launchings.

As a principal object this invention is directed to the provision of submersible, missile launching vehicles able to carry single missiles under deep-submerged approach to hovering positions from which upon command, the vehicle or a separable part thereof transports the missile to or near the surface of the ocean where it is ejected to assume an independent course of travel through the air, leaving the vehicle, or a manned portion thereof, to return to a support base in a submerged condition.

Another object of this invention is the provision of deep submergence vehicles of the foregoing character comprising a first or forward hull portion having suitable pressure resisting compartmentation for accommodating the vehicle crew propulsion machinery, control means, navigational and other equipment, and a second or after hull portion connected to the first hull portion and adapted to house a missile to be launched. In at least one embodiment the entire vehicle transports the missile toward the surface from a deep submergence condition and the missile is ejected from the second hull portion at or near the surface, leaving the entire vehicle to return to its base. In other embodiments, the second hull portion is separated from the manned remainder of the vehicle prior to ejection of the missile, the remainder of the vehicle returning to its base, and the separated hull portion being sacrificed after ejection of the missile.

Yet another object of this invention is the provision of submersible vehicles comprising propulsion and ballast control machinery for operating in a normal submerged condition with the longitudinal axis of the vehicle in a horizontal position during normal patrolling or travel to and from a launch site, and which is adapted to operate with the longitudinal axis in a vertical position during hovering on station or during acceleration of the missile toward the surface for ejection.

As another object this invention aims to provide an improved missile launching vehicle having the capabilities mentioned in the preceding paragraph and comprising a cabin which is rotatable about a horizontal transverse axis of the vehicle so as to maintain a level operating platform for operating personnel at all times irrespective of whether the vehicle is operating with its longitudinal axis in a horizontal or vertical position.

Other objects and many of the attendant advantages of this invention will be readily appreciated as the same becomes better understood by reference to the following detailed description when considered in connection with the accompanying drawings in which like reference numerals designate like parts throughout the figures hereof and wherein:

FIG. 1 is a longitudinal sectional view of a deep submergence missile launching vehicle embodying the present invention;

FIG. 2 is a rear end view of the vehicle of FIG. 1 as viewed along line 2—2 thereof;

FIG. 3 is a diagrammatic view illustrating maneuvers of the vehicle of FIG. 1;

FIG. 6 is a longitudinal view of another vehicle embodying the invention;

FIG. 7 is a diagrammatic view illustrating maneuvers of the vehicle of FIG. 6;

FIG. 8 is an elevational view, with portions broken away, of still another vehicle embodying the invention; and FIG. 9 is an elevational view, with portions broken away, of yet another vehicle embodying the invention.

Figure 4:
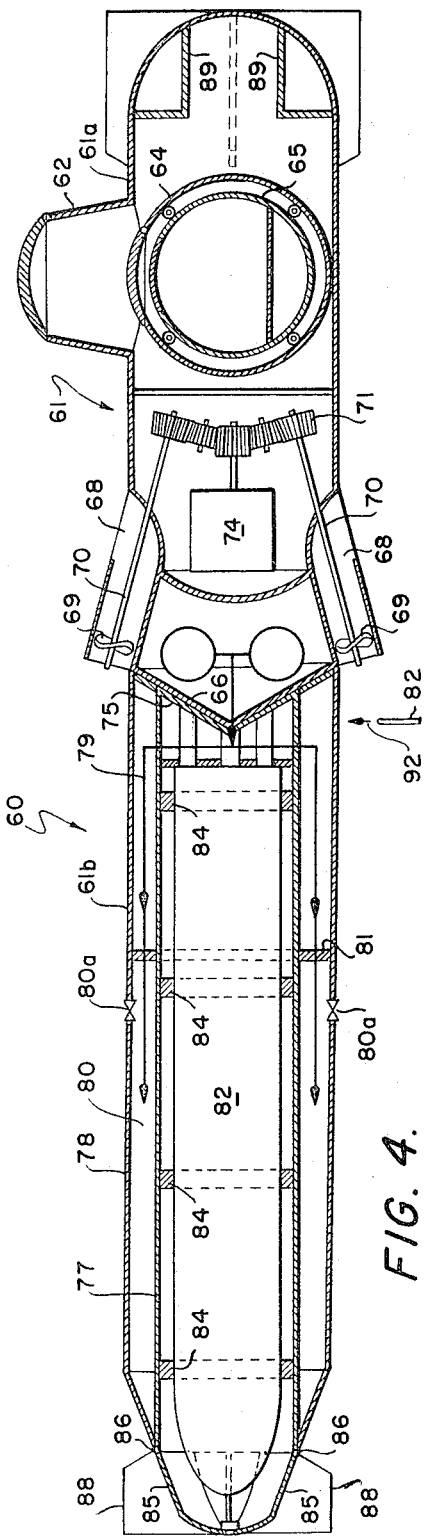
FIG. 4 is a longitudinal sectional view of another vehicle embodying the invention.

In the form of the invention illustrated in FIGS. 1 and 2, there is provided a missile carrying vehicle generally indicated at 10. The vehicle 10 comprises an elongated hull 11 divided by a bulkhead 12 into a first or forward portion 11a and a second or after portion 11b. The forward hull portion 11a is a pressure hull which is provided with an access tower 13 and houses machinery such as a nuclear power plant, motor generators, batteries or the like indicated schematically at 14. The forward hull 11a also houses crews spaces, control means, navigational instruments and the like, preferably in a spherical inner pressure hull 16 for maximum safety against extreme pressures.

Because the maneuvers through which the vehicle 10 goes when launching a missile call for the vehicle to assume a position with its longitudinal axis vertically disposed, the inner pressure hull 16 is conveniently provided with a personnel cabin 17 which is rotatable about a transverse horizontal axis 18 so as to provide a platform 19 which is substantially level at all times. For this purpose the cabin 17 is supported by suitable rollers 20. The relative movement may be limited to about 120° of rotation between the hull 11 and the cabin 17 thereby eliminating need for any sliding electrical contacts or special pressure joints, coiled cables and flexible pressure lines being sufficient to accommodate such movements in a manner well known to those skilled in the art to which the invention pertains.

The second or after hull portion 11b is provided with a tubular pressure hull 24 which serves as a receptacle for missile 25 which is fitted with suitable adapter rings 26 for centering the missile in the tubular hull 24. The adapter rings 26 may be of any well known type such as those which are formed of rubber segments having friction reducing coatings of polytetrafluoroethylene or the like.

The tubular pressure hull 24 is fitted with closure means in the form of a plurality of watertight doors 27 which are hinged at 28 to the tubular pressure hull for movement into open positions. In this example there are four such doors 27 which provide a four pointed star-like configuration when opened and viewed from the rear of the vehicle 10. A releasable securing means 27a normally holds the doors closed and may be actuated to forcefully move the doors to their open positions. Such a means is more fully described in copending application Serial No. 427,992, filed January 25, 1965, to which reference may be had for further description. The doors 27 may be fitted with suitable vanes 29 for contributing to the control and/or stability of the vehicle when in motion. Similar vanes 30 are provided on the ellipsoidal nose of the vehicle. Of course, the vanes 29 and 30 may have suitable movable portions making them more effective as control surfaces.

The after hull portion 11b further comprises an outer shell 32 surrounding the tubular pressure hull 24 in spaced relation thereto so as to define annular ballast tanks 33 at the mid-portion of the vehicle 10, and annular buoyancy propulsion tanks 34 near the after end thereof, the latter being separated from the former by suitable bulkheading 35. Disposed in the after end of the forward hull portion 11a are a plurality of spherical air pressure flasks 36 which are connected by suitable piping 37 and valve means (not shown) to the interior of the buoyancy propulsion tanks 34. These tanks are fitted near the bulkheading 35 with vent ports or valves 34a. The purpose and use of the buoyancy propulsion tanks 34 will be described in more detail hereinafter.

The after hull portion 11b is provided with propulsion means including a plurality of radially extending fin-like structures 38 defining fore-and-aft extending water tunnels 39 in each of which is disposed a shaftless impeller 40. The impellers 40 are each fixed within a hollow rotor 41 forming part of a shaftless submersible electric motor 42. The electric motors are reversible and are supplied with electric power from main generators forming part of the machinery 14 in the forward hull portion 11a. Operation of the motors 42 causes water to move through the ducts 39 in the desired direction to produce forward or rearward motion of the vehicle in a manner well understood by those familiar with marine propulsion.

Referring to FIG. 3, the vehicle 10 is illustrated at a position a in the left portion of the view, proceeding under deep submergence along a course 45 toward a launching site, the vehicle having its longitudinal axis disposed generally horizontally. In this condition it will be understood that tanks 33 and 34 are flooded, and that other trimming ballast tanks such as indicated at 46 in FIG. 1 are flooded only to the degree necessary to maintain a substantially zero horizontal hovering buoyancy. As the vehicle approaches the launch site, the control surfaces and the flooding of trim tanks 46 are adjusted so that it noses down to assume a position b with its longitudinal axis vertically disposed, and the doors 27 uppermost. Because of the rotatable cabin 17, the personnel will be afforded a level platform 19, and the vehicle 10 may hover in the position b for a considerable time.

Upon command, air from the pressure flasks 36 is discharged through the piping 37 into the buoyancy propulsion tanks 34 expelling water therefrom through the vent ports 34a. This effects a substantial positive buoyancy in the vehicle 10 particularly in the after portion thereof. The positive buoyancy propels the vehicle 10 upward along a path 48 toward a position c. Preferably, means are provided for flooding the pressure flasks 36 immediately after the buoyancy propulsion tanks 34 are blown so as to develop a more favorable righting moment acting to stabilize the vertical attitude of the vehicle. Because of the decreasing water pressure experienced as the vehicle ascends, the air in the buoyancy propulsion tanks will continuously expand and vent through the ports 34a.

The ascending vehicle passes through position c to a position d where the doors 27 are shown as having been forcefully opened by the securing and opening means 27a. The opened doors act as a brake so as to retard the upwardly accelerating vehicle 10. When the doors 27 are opened, expanding air from tanks 34 is diverted by any suitable means to the interior of the tubular pressure hull 24 between the bulkhead 12 and the lower end of the missile 25, thereby pneumatically ejecting the same from the vehicle. In this regard the adapter rings 26 serve to prevent loss of air during ejection. Details of such air diverting means may be had by reference to the aforementioned copending patent application.

The ejection of the missile 25 is aided by its moving inertia as the vehicle 10 is braked by the opening doors 27. The ejection takes place sufficiently near the surface that the missile 25 breaks the surface as shown at e and clears it for firing of its own boosters at position f. Thereafter the missile continues under its own power as necessary to accomplish its mission.

From its braked position d the vehicle 10, having flooded the buoyancy tanks 34, closes the doors 27 and moves along a course 50, leveling off at a suitable depth as shown at position g. Upon closing the doors 27, the amount of water in the tubular pressure hull 24 may be adjusted to compensate for the weight of the ejected missile 25. The buoyancy propulsion tanks 34 are "soft" tanks, that is to say they are always more or less open through the vent ports 34a. Accordingly, as the vehicle proceeds downwardly the pressure within the relatively light shell 34 will increase as necessary to prevent crushing. From position g the vehicle 10 proceeds underwater to return to its base of operations.

Figure 5:
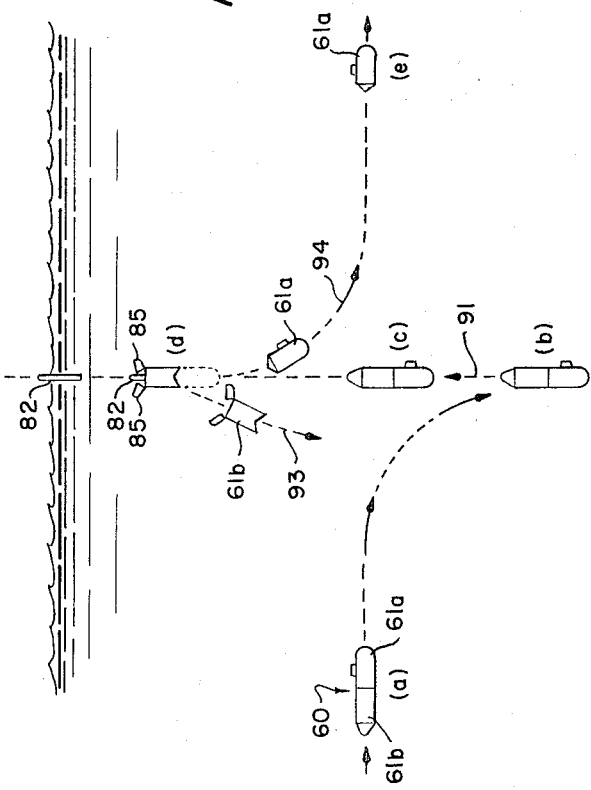
FIG. 5 is a diagrammatic view illustrating maneuver of the vehicle of FIG. 4.

In the form of the invention illustrated in FIGS. 4 and 5, there is provided a deep submergence missile carrying and launching vehicle 60 comprising a hull 61 having a first or forward portion 61a and a second or after section 61b. In this embodiment, like the one described above, the forward hull section comprises a pressure hull having an ellipsoidal nose, an access tower 62, and inner spherical pressure hull 64, and a rotatable cabin 65 in the inner pressure hull. The rear end of the forward hull portion 61a is however, defined by a conical end wall 66, and the forward hull portion is provided with a plurality of water ducts 68 in each of which is disposed a rotatable impeller 69.

The impellers 69 are mounted for rotation by shafts 70 driven through suitable reduction gearing 71 by propulsion machinery such as a nuclear power plant or the like schematically indicated at 74.

The after hull portion 61b has its forward end defined by a conical end wall 75 which is complementary to wall 66 of the forward hull portion and the two hull portions are releasably secured together with the conical walls in mated engagement. The hull portion 61b includes a tubular missile receiving, pressure hull 77 surrounded by a shell 78 so as to define therebetween ballast tanks 79 and buoyancy propulsion tanks 80, which tanks are separated by suitable bulkheading 81. The tanks 80 are provided with suitable vent ports 80a.

A missile 82 is supported in the tubular pressure hull 77 by suitable adapter rings 84, and the tubular pressure hull 77 is closed by doors 85 which are hinged at 86 and secured by releasable means 87. Vanes 88 are provided on the doors 85 to aid in the stability of the vehicle 60, and additional trimming ballast tanks 89 are provided in the hull as necessary to adjust buoyancy for horizontal and vertical hovering.

Referring now to FIG. 5, the vehicle 60 is shown at a position a making a deep submergence approach to a launching site the vehicle being propelled by reaction of jets of water driven through ducts 68 by impellers 69. At position b the vehicle 60 has nosed down and trimmed ballast to assume a vertical hovering position from which it ascends rapidly along a vertical path 91 through position c under the influence of blown buoyancy propulsion tanks 80.

At position d the doors 85 open, the missile 82 is ejected and, as a distinguishing feature from the previous embodiment 10, the after hull portion 61b is separated from the forward section at the conical walls 66, 67. The missile 82 rises through the water surface, and its boosters are fired carrying the missile on its own course 93 to its target.

The separated after hull portion 61b falls away along a path 92 and is sacrificed. From the position d the forward hull portion 61a proceeds downwardly along a path 94 and levels off at depth indicated by position e from which it proceeds to return to its home base for future operations with a new after hull portion 61b.

In the form of the invention illustrated in FIGS. 6 and 7, there is provided a deep submergence missile carrying and launching vehicle 100 comprising a hull having a first or forward portion 101a and a second or after section 101b. In this embodiment, like the ones described above, the forward hull section comprises a pressure hull 102 having an ellipsoidal nose 102a, an access tower 103, an inner spherical pressure hull 104, and a rotatable cabin 105 in the inner pressure hull. The rear end of the forward hull portion 101a is however, defined by an ellipsoidal end wall 112, and the forward hull portion is provided with a plurality of water ducts 106 arranged around the ellipsoidal nose 102a and having common intake 107 in which is disposed a rotatable impeller 108.

The impeller 108 is mounted for rotation by a shaft 109 driven through suitable reduction gearing by propulsion machinery such as a nuclear power plant or the like schematically indicated at 110.

The after hull portion 101b has its forward end defined by a curved end wall 115 which is disposed adjacent wall 112 of the forward hull portion. The after hull portion 101b further includes a tubular, missile receiving, pressure hull 117 surrounded by a shell 118 so as to define therebetween ballast tanks 119 and buoyancy propulsion tanks 120, which tanks are separated by suitable bulkheading 121. The forward and after hull portions 101a and 101b are releasably secured together at 118a where the shell 118 of the after section engages the forward hull portion.

A missile 122 is supported in the tubular pressure hull 117 by suitable adapter rings 124, and the hull 117 is closed by watertight doors 125 which are hinged at 126 and secured by releasable means 127. Vanes 128 are provided on the doors 125 to aid in the stability of the vehicle 100, and additional trimming ballast tanks 129 are provided in the hull as necessary to adjust buoyancy for horizontal and vertical hovering.

Referring more particularly now to FIG. 7, the vehicle 100 is shown at a position a making a deep submergence approach to a launching site being propelled by reaction of jets of water driven through ducts 106 by impeller 108. As position b the vehicle 100 has nosed down and trimed ballast to assume a vertical hovering condition in which the after hull portion 101b is separated from the forward hull portion 101a and ascends rapidly along a vertical path 131 through position c under the influence of blown buoyancy propulsion tanks 120.

At or near the surface, shown as position d, the doors 125 open, the missile 122 is ejected from the hull portion 101b and its boosters are fired carrying it on its own course 132 to its target.

Following ejection, the after hull portion 101b falls away along a path 133 and is sacrificed. From the position b the forward hull portion 101a proceeds downwardly along a path 134 and levels off at a depth indicated by position e from which it proceeds to return to its home base for future operations with a new after hull portion 101b.

Another vehicle 150 embodying the invention is illustrated in FIG. 8, this embodiment differing from that of FIG. 1 only in the main propulsion means. Accordingly, the vehicle 150 of FIG. 8 will be only briefly described as compriising forward and after hull portions 151a and 151b, the forward hull portion being provided with an access tower 152.

The after hull portion 151b includes a tubular pressure hull 154 as a receptacle for a missile 155, the hull 154 being provided with closure means in the form of water tight doors 156 on which are mounted suitable fins 157. Buoyancy propulsion tanks 160 are defined between the tubular pressure hull 154 and a shell 161, ports being indicated at 162 through which the water in the tanks may be blown to produce the positive buoyancy for propelling the vehicle 150 during vertical ascent for launching of the missile 155.

The main propulsion means for the vehicle 150 comprises contra-rotating sets of impeller blades 164 and 165, the blades 164 being carried by a ring shaped rotor 166 of a first shaftless motor 167, and the blades 165 being carried by a ring shaped rotor 168 of a second shaftless motor 169.

It will be appreciated that the maneuvering in approach, ascent and launch, and departure from the launch site will be the same for the vehicle 150 as for the previously described vehicle 10.

Yet another vehicle 170 embodying the invention is illustrated in FIG. 9, this embodiment differing from that of FIG. 4 only in the main propulsion means, and accordingly will only be briefly described. The vehicle 170 comprises a forward hull portion 171a and an after hull portion 171b releasably secured to the forward hull portion and separable therefrom between cone shaped end walls 172, 173 of the respective hull portions. The after portion carries a missile in a tubular pressure hull and comprises buoyancy propulsion tanks from which ballast water may be expelled through ports 175.

The main propulsion means for the vehicle 170 comprises contra-rotating sets of impeller blades 177, 178, mounted on ring shaped rotors 179, 180 of shaftless motors 181, 182 respectively. The motors 181, 182 and their respective blades are associated only with the forward hull portion 171a so that, after separation of the after hull portion during a launching maneuver similar to that described with reference to vehicle 60 and FIG. 5, the forward hull portion 171a may operate independently and return to its home base.

From the foregoing detailed description of several deep submergence vehicles embodying the invention, it will be appreciated that the previously stated objects and advantages, as well as others apparent from the description, have been provided for by the invention.

Obviously many modifications and variations of the present invention are possible in the light of the above teachings. It is therefore to be understood that, within the scope of the appended claims, the invention may be practiced otherwise than as specifically described.

What is claimed is:

1. A deep submergence missile launching vehicle comprising:
    elongated hull means including a forward hull portion and an after hull portion;
    water impeller means for effecting longitudinal motion of said vehicle;
    one of said hull portions comprising pressure hull means housing propulsion machinery for operating said impeller means and housing control means;
    the other of said hull portions comprising a tubular pressure hull for receiving a missile, closure means for said tubular pressure hull at the end thereof remote from said one hull portion, and buoyancy propulsion tank means;
    ballast tank means in said hull means for varying the trim of said vehicle for alternatively hovering with its longitudinal axis in a horizontal position or in a vertical position with said closure means uppermost;
    means for displacing water from said buoyancy propulsion tank means to provide a substantial positive buoyancy for accelerating said vehicle from a vertical hovering position toward the water surface for ejection of a missile from said tubular pressure hull.

2. A deep submergence missile launching vehicle as defined in claim 1 and wherein said one hull portion further comprises:
    an inner pressure hull; and
    a cabin for said control means and a vehicle crew, said cabin being rotatably mounted within said inner pressure hull whereby said cabin can remain in a level condition when said vehicle assumes either its horizontal or vertical position.

3. A deep submergence missile launching vehicle as defined in claim 1 and wherein said other hull portion is separable from said one hull portion.

4. A deep submergence missile launching vehicle as defined in claim 2 and wherein said other hull portion is separable from said one hull portion.

5. A deep submergence missile launching vehicle comprising:
- elongated hull means including a forward hull portion and an after hull portion releasably connected together;
- impeller means mounted on one of said hull portions for effecting longitudinal motion of said vehicle;
- control means and propulsion machinery for operating said impeller means being housed in said one of said hull portions;
- the other hull portion comprising a tubular pressure hull for receiving a missile, closure means for said tubular pressure hull at the end thereof remote from said one hull portion, and buoyancy propulsion tank means externally of said tubular pressure hull and adjacent said closure means;
- ballast tank means in said hull means for varying the trim of said vehicle for alternatively hovering with its longitudinal axis in either a horizontal position or a vertical position with said closure means uppermost;
- means for displacing water from said buoyancy propulsion means to provide a substantial positive buoyancy for accelerating at least said other hull portion of said vehicle toward the water surface for ejection of a missile from said tubular pressure hull; and
- said one hull portion being operable in a deep submergence condition independently of said other hull portion.

6. A deep submergence missile launching vehicle as defined in claim 5 and wherein said one hull portion further comprises:
- an inner pressure hull;
- a cabin for said control means and the vehicle crew, said cabin being mounted within said inner pressure hull for rotation relative to said vehicle about a transverse horizontal axis thereof whereby said cabin can remain level irrespective of whether said vehicle is in a vertical or horizontal position.

7. A deep submergence missile launching vehicle as defined in claim 5 and wherein said other hull portion is said after hull portion.

8. A deep submergence missile launching vehicle as defined in claim 6 and wherein said other hull portion is said after hull portion.

No references cited.

BENJAMIN A. BORCHELT, *Primary Examiner.*

S. W. ENGLE, *Assistant Examiner.*